US007647402B2

(12) United States Patent
McBrearty et al.

(10) Patent No.: US 7,647,402 B2
(45) Date of Patent: Jan. 12, 2010

(54) PROTECTING CONTENTS OF COMPUTER DATA FILES FROM SUSPECTED INTRUDERS BY RENAMING AND HIDING DATA FILES SUBJECTED TO INTRUSION

(75) Inventors: Gerald Francis McBrearty, Austin, TX (US); Shawn Patrick Mullen, Buda, TX (US); Johnny Meng-Han Shieh, Austin, TX (US); Michael William Wortman, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 2267 days.

(21) Appl. No.: 09/801,612

(22) Filed: Mar. 8, 2001

(65) Prior Publication Data

US 2002/0133590 A1    Sep. 19, 2002

(51) Int. Cl.
G06F 15/16 (2006.01)
G06F 15/173 (2006.01)
G06F 11/00 (2006.01)
(52) U.S. Cl. .......................... 709/225; 709/217; 726/23
(58) Field of Classification Search .................. 380/4; 707/1; 709/217, 225; 726/23
See application file for complete search history.

(56) References Cited

U.S. PATENT DOCUMENTS 5,933,498 A * 8/1999 Schneck et al. ............... 705/54
2002/0038296 A1 * 3/2002 Margolus et al. ............... 707/1

* cited by examiner

Primary Examiner—J Bret Dennison
(74) Attorney, Agent, or Firm—J. B. Kraft; David A. Mims, Jr.

(57) ABSTRACT

Protecting data files from being stolen or compromised in a data processing operation having stored data in a plurality of data files by receiving user requests for access to data files, determining whether said requests are unauthorized intrusions into the requested data files and, responsive to a determination that a request is an unauthorized intrusion, changing the identification of the requested data files by renaming the files. Preferably, the rename should be one which does not identify the contents of the file, i.e. the rename disguises the file contents. Then, it is also desirable that the renamed file be moved to a new "hidden" directory. In such a case, the renamed file is also assigned a covert name which indicates a covert location in the new directory. Then, there is provided a log referencing each renamed file to the covert name of the respective file so as to indicate the covert location of said file in said new directory.

45 Claims, 4 Drawing Sheets

PROTECTING CONTENTS OF COMPUTER DATA FILES FROM SUSPECTED INTRUDERS BY RENAMING AND HIDING DATA FILES SUBJECTED TO INTRUSION

CROSS-REFERENCE TO RELATED PATENT APPLICATION

The following copending patent application, assigned to the assignee of the present invention covers subject matter related to the subject matter of the present patent application: PROTECTING CONTENTS OF COMPUTER DATA FILES FROM SUSPECTED INTRUDERS BY PROGRAMMED FILE DESTRUCTION, G. F. McBrearty et al. Ser. No. 09/801,614 filed on the same date as the present application.

TECHNICAL FIELD

The present invention relates to the protection of files from unauthorized or suspected intrusion in computer systems, and particularly in managed communication networks such as the World Wide Web (Web).

BACKGROUND OF RELATED ART

The past decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet (the terms are used interchangeably) commenced a period of phenomenal expansion. With this expansion, businesses and consumers have direct access to all matter of documents, media and computer programs.

In order for the Web to reach its full potential as the basic channel for all world wide business and academic transactions and communications, the providers and users of the Web and like networks must be assured an open communication environment, as well as protection of the data that is offered over the Web and the requests made for such data. With the rise of the Web, there has been an unfortunate increase in the number of malicious users who, at the least, try to disrupt Web and other network services and, at their worst, try to steal goods, services and data accessible over the Web. Of course, the industry has been working for many years to eliminate, or at least neutralize, the efforts of such malicious users.

In addition, although electronic and Web business have vast potential, many consumers and business organizations are just beginners in that marketplace and are skeptical and uneasy about making their files accessible to others based upon network authorization. Thus, a significant compromise of data files or theft of data files could be disastrous to vendors trying to establish a sense of stability in that marketplace.

Despite these security problems, the above factors have given rise to a new way of doing business, electronic business or E-business. This, of course, involves conducting all matter of business over the Web public network and/or private networks when greater security is demanded. Electronic business requires the electronic handling and collection of cumulatively vast quantities of money. As a result, there are great quantities of records tracking transactions stored as files at various network nodes, as well as in individual computer systems. In order for electronic business to function, it is necessary to make quantities of these stored files available to a wide variety of users with various "needs to know" to handle various electronic business billing and other transactions. Thus, there are established levels of authorizations granted to users for accessing the contents of files. At the various levels in any database, there are different users authorized to access the data files at that level. The database manager determines which users will be authorized to access data at that particular level.

In the Web, as well as in individual computer systems, routines must be made available to authenticate that the users requesting access to a particular database are indeed the same users who have been authorized for access. To that end the Web uses an authentication protocol known as Kerberos, which is a network authentication protocol developed by The Massachusetts Institute of Technology (MIT). Kerberos authenticates the identity of users attempting to logon to the Web or to access databases on the Web. It does this through a secret key cryptology. Authenticated users may also transmit Kerberos encrypted communications over the Web. Kerberos is available in many commercial products, and free implementations are available from MIT at site: (http://web.mit-.edu/kerberos/www/).

Unfortunately, with the great sophistication in computer hacking of potential unauthorized intruders both within and on the outside of business organizations to access secure data, authorization is no longer just a simple comparison of user IDs to simple authorization lists and denying unauthorized requesters. For example, through a variety of "Confidence" ruses inside and outside of computer transactions in combination with other ploys, some skilled hackers can discover "root user" or "super user" identities which permit them to get inside of a database or directory. Once they have, thus, cracked into a database or directory, the hackers are in an excellent position to steal data from files or to trash files. While security is such that even inside of the database or directory, the hacker still needs authentication in order to access the data in individual files, he is in a much easier position to use iterative identifier routines to try to crack the authentication encryptions which protect individual files.

SUMMARY OF THE PRESENT INVENTION

The present invention provides a system, method and program for protecting data files from being stolen or compromised. Accordingly, the invention provides, in a data processing operation having stored data in a plurality of data files, a system for protecting said data files from unauthorized users, comprising means for receiving user requests for access to data files, means for determining whether said requests are unauthorized intrusions into the requested data files and means, responsive to a determination that a request is an unauthorized intrusion, for changing the identification of the requested data files.

The present invention offers a very aggressive solution to the problem of theft of data in files. The response should take place at the first suspicion of intrusion. For example, the events being monitored may indicate that someone has been able to enter the database as a "root" or super user. In other words, "the fox is in the hen house". The first response is to rename any file which appears to be targeted, i.e. to change the overt identification of the file. Preferably the rename should be one which does not identify the contents of the file, i.e. the rename disguises the file contents. Then, it is also desirable that the renamed file be moved to a new "hidden"

directory. In such a case, the renamed file is also assigned a covert name which indicates a covert location in the new directory. Then, there is provided a log referencing each renamed file to the covert name of the respective file so as to indicate the covert location of said file in said new directory.

While the present invention satisfies present needs in network and particularly Web file protection, the principles of the invention are equally applicable to stored data files associated with independent computer systems.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
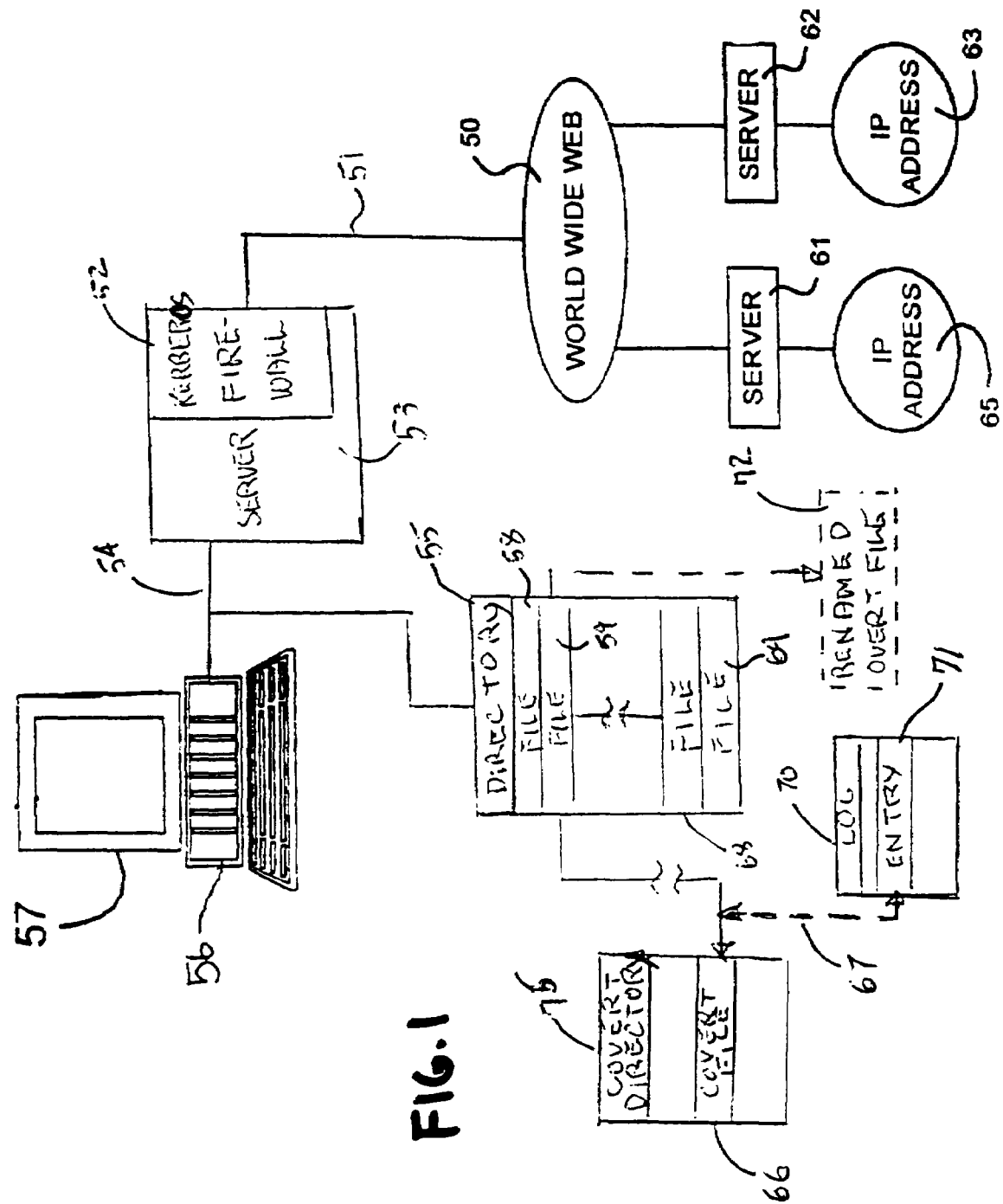
FIG. 1 is a generalized diagrammatic view of a Web portion showing how Web sites may be accessed by and protected from unauthorized and malicious requesting users.

Referring to FIG. 1, there is provided a generalized view of a network, such as the Web or Internet showing the Web 50 and Internet addresses 63 and 65, respectively, connected to the Web 50 via Web servers 61 and 62.

By way of background and for details on Web nodes, objects and links, reference is made to the text, *Mastering the Internet*, G. H. Cady et al., published by Sybex Inc., Alameda, Calif., 1996; or the text, *Internet: The Complete Reference, Millennium Edition*, Margaret Young et al., Osborne/McGraw-Hill, Berkeley, Calif., 1999. Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers. Reference may be made to the above-mentioned *Mastering the Internet*, pp. 136-147, for typical connections between local display stations to the Web via network servers, any of which may be used to implement the system on which this invention is used.

It is through such Internet addresses as locations 63 and 65 that potential hackers may intrude upon Web or Internet stations 57 having control of associated databases, which are simply illustrated by directory 55 containing groups of files such as files 58, 59, . . . 68, 69. It should be noted that for the purpose of this illustration there is shown only one Web station and associated database. However, many databases may be accessed over the Web and the present invention is intended to protect such Web sites and databases in the manner which we will describe with respect to Web site or Internet station 57. This station is connected to the Web through connection 51 and Web server 53 which includes firewall 52.

Thus, files may be requested by users at stations such as Web station 57 including computer 56 throughout the Web 50 or requests for files may come from users at IP locations such as addresses 63 and 65. Such requests are processed to the particular database through the respective Web station server 53. Each server has the means for processing such requests, including authenticating the user IDs and then determining whether such identified users have authorizations for particular data file access to be hereinafter described. These authentication and authorization processes are illustratively shown to be encompassed within firewall section 52. Preferably, the above-described Kerberos protocols are used for this purpose. The computer 56, which serves as the Web station 57, has its own associated database made up of one or more directories 55 of files. Such directories 55 in the database may be directly accessed by the user of computer 56 as a standalone computer irrespective of its Web connections. Thus, when the routines for determining user authentication and authorization and the renaming and hiding of hacker targeted files are described, it will be understood that such routines may be performed to check authentication and authorization as a Web data access function in the server 53 or as routines performed within the computer 56 system to check on user requests made directly to computer 56. In the descriptions of the programs and routines which follow related to how hacker targeted files are disguised and hidden, it will be understood that the running of such routines are preferably shared between computer 56 and server 53 in the case of requests for data files made over the Web.

Now, with respect to the protection of files suspected of being under attack, assume that there is an intruder that has obtained sufficient identity to have root user or super user access to the database of directory 55 and files 58, 59, . . . 68, 69. The Kerberos firewall 52 has authenticated such access via connection 54 to the directory. One simple tracking program, let us say in the server 53, has determined that there have been several unsuccessful authentication attempts to files 58 and 59 which triggers an alert that these files may be the targets of a hacker intrusion using some sort of routine which rapidly applies a series of iterative number keys. Following the program with respect to file 59, it is renamed with a new overt name 72. File 59 is also moved from directory 55 to a new hidden or covert directory 75 where the file is assigned a covert file name to identify the covert location of the file. Then a log 70 is maintained having an entry 71 connecting the renamed overt file 72 to the covert location 66 of the file. In this manner, the hacker attacking the files is still continuing to look for the original file which has been renamed, hidden in a different directory and, thus, protected. The owner of the original file must, of course, be notified of the change.

Figure 2:
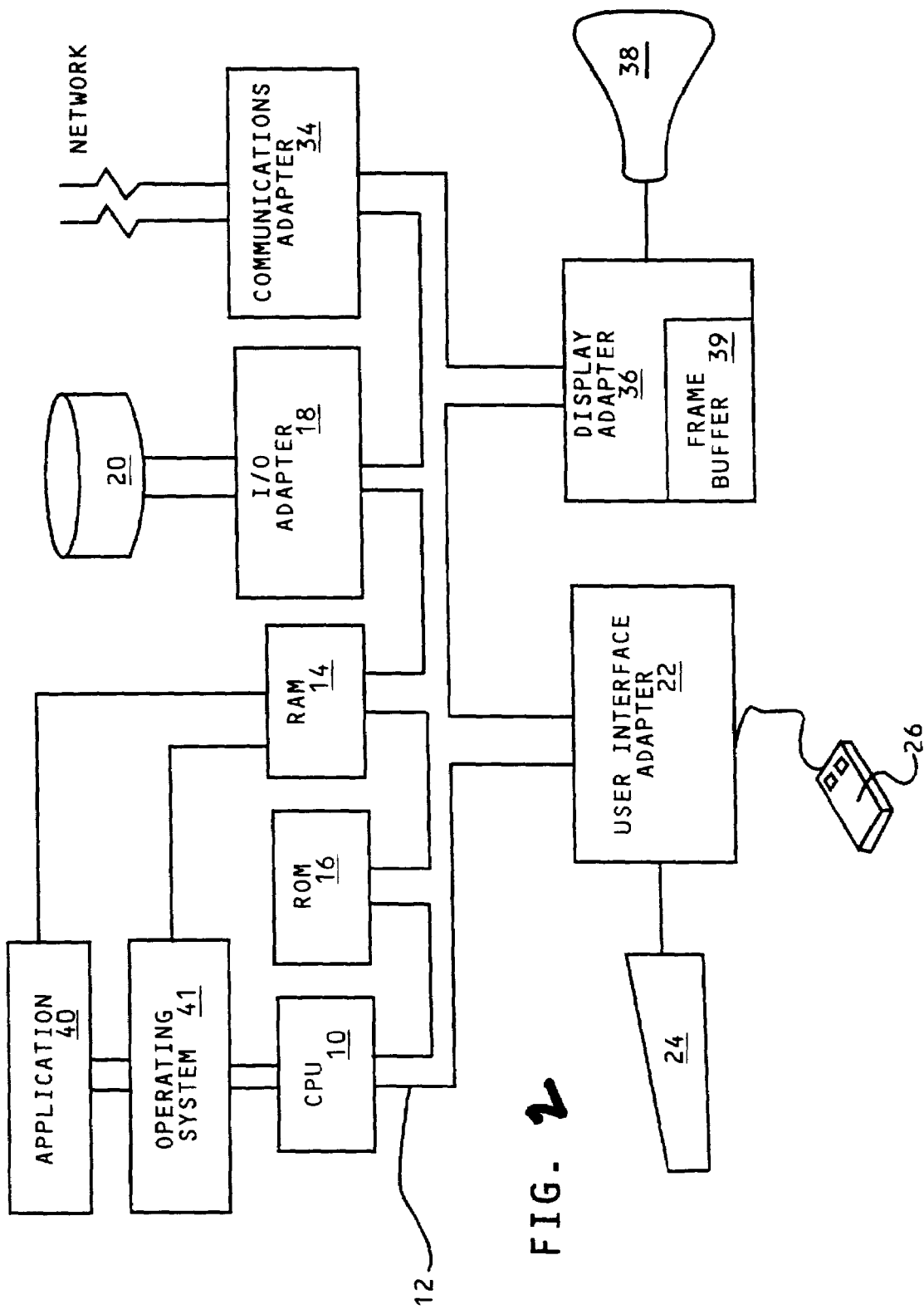
FIG. 2 is a block diagram of a data processing system including a central processing unit and network connections via a communications adapter which is capable of functioning both as a display computer for controlling Web stations and sites and as the servers for monitoring user request patterns to determine unauthorized access or intrusion.

Referring to FIG. 2, a typical data processing terminal is shown which may function as the computer terminal for Web stations, e.g. terminal 57, FIG. 1, for the requesting user or the servers which connect requesting user sites or Web sites into the Web. A central processing unit (CPU) 10, such as one of the PC microprocessors or workstations, e.g. RISC System/6000 (™) (RS/6000) series available from International Business Machines Corporation (IBM), is provided and interconnected to various other components by system bus 12. An operating system 41 runs on CPU 10, provides control and is used to coordinate the function of the various components of FIG. 2. Operating system 41 may be one of the commercially available operating systems such as the AIX 6000™ operating system available from IBM; Microsoft's Windows98™ or WindowsNT™, as well as UNIX and AIX operating systems. Application programs 40, controlled by the system, are moved into and out of the main memory, Random Access Memory (RAM) 14. These programs include the programs of the present invention for the protection of open databases at their server and from any intruding user requesting data files directly from any computer system.

A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with an outside network enabling the data processing system to communicate, as respectively described above, through the Web or Internet. I/O devices are also connected to system bus 12 via user interface adapter 22 and display adapter 36. Keyboard 24 and mouse 26 are all interconnected to bus 12 through user interface adapter 22. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 3:
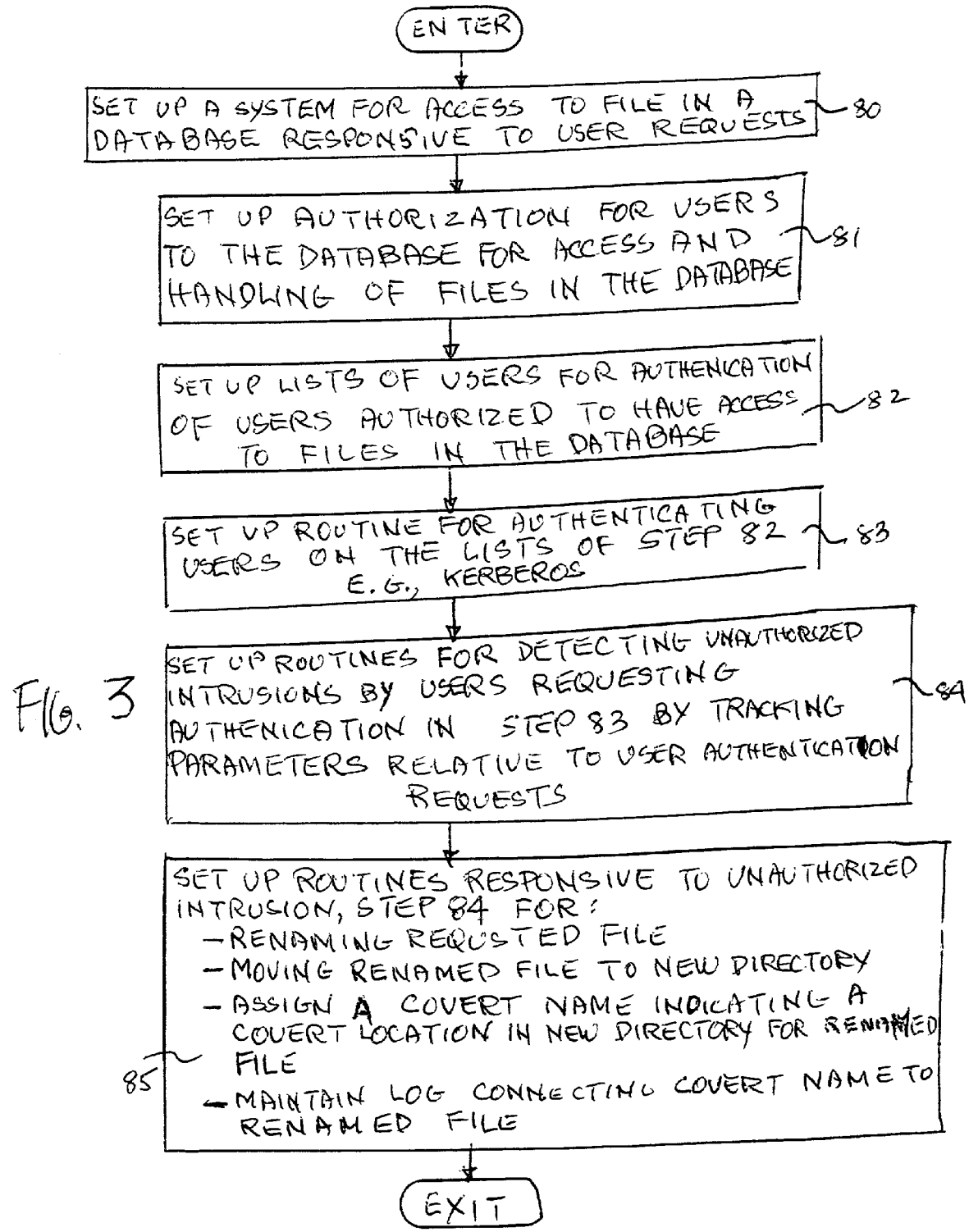
FIG. 3 is an illustrative flowchart describing the setting up of the elements of a program according to the present invention for protecting Web stations, as well as computer systems, from malicious requesting users.

Now, with reference to the programming shown in FIG. 3, the program of the present invention is set up. There is set up at the servers of the databases accessible through the Web and/or at individual computer systems, a system to access files in a database responsive to user requests, step 80. Authorization is then determined for users authorized to have access to files in a particular database, step 81. There are then set up lists of users for authentication of users authorized to have access to files in the database, step 82. Routines such as Kerberos authentication are set up, step 83, for authenticating users on the authorized lists of step 82. Routines are set up, step 84, for detecting unauthorized intrusions by users requesting authentication, in step 83, by tracking parameters relative to user authentication requests. When an unauthorized intrusion is suspected, step 84, then step 85, the following routines are set up: the file targeted by the intruder is renamed; the renamed file is moved to a new directory; the renamed file is assigned a covert name indicating a covert location in a new directory for the renamed file; and a log is maintained connecting the covert name to the renamed file.

Figure 4:
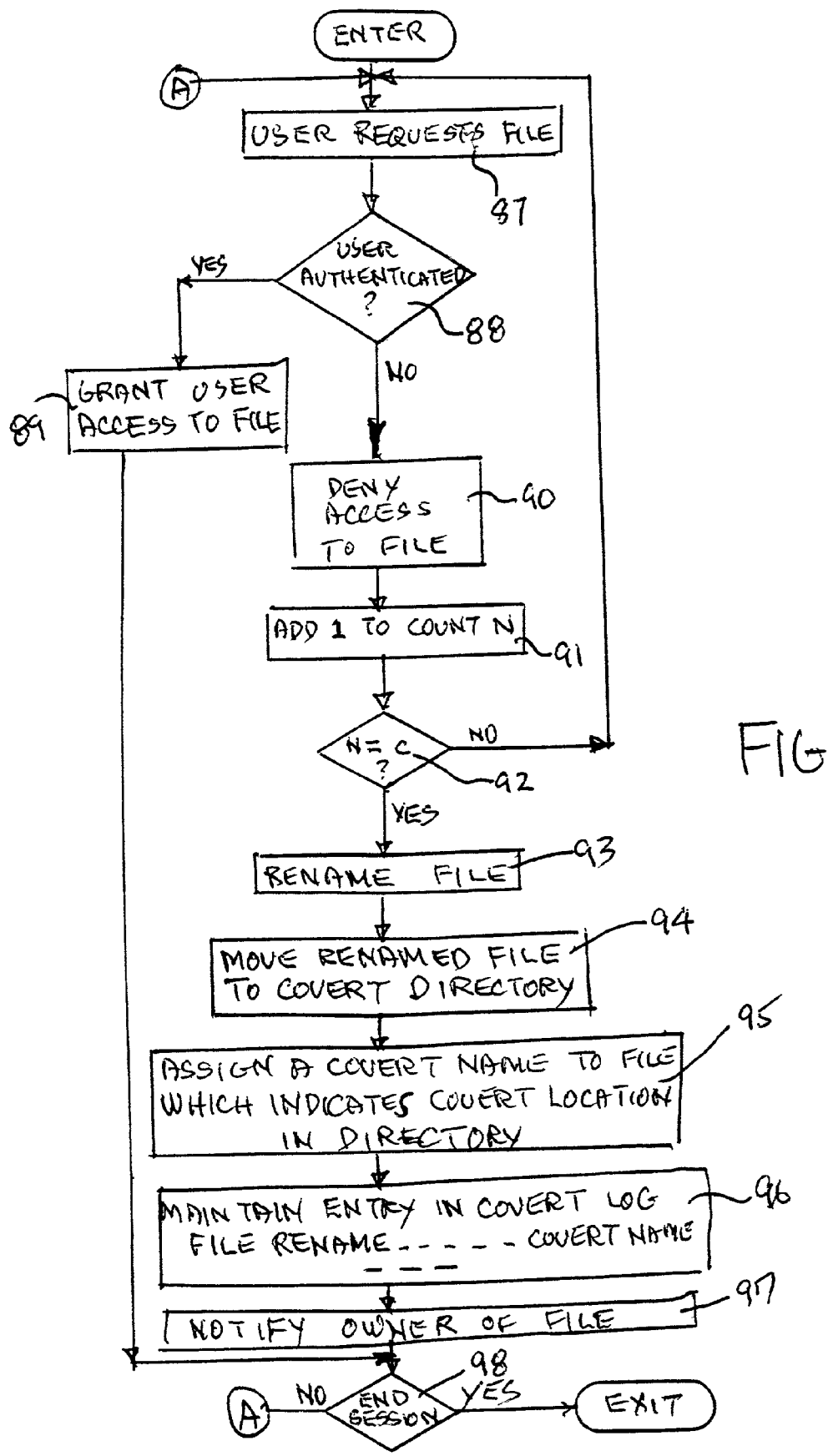
FIG. 4 is a flowchart of an illustrative run of the program set up in FIG. 3.

Now, with reference to the flowchart of FIG. 4, a simplified illustrative run of the process set up in FIG. 3 will be described. The simplification is made so as to illustrate an understandable process. In considering this example, it should be understood that in many processes the criteria for determining whether there has been unauthorized use or intrusion may be more complex. However, the complexity of such a determination is not the present invention. The invention involves how the files are treated once a determination of unauthorized access has been made. When a user requests a file, step 87, a determination is made, step 88, as to whether the user is authenticated, i.e. his ID matches the ID of the authorized user via the Kerberos authentication protocols. If Yes, the user is granted access to the requested file, step 89. If No, then the user is refused access to the file, step 90. In the present case, just because there has been a first failure at authentication is not considered to mean that an unauthorized intrusion is at hand. A count N of such failures is maintained and one is added to the count, step 91. Then, a determination is made, step 92, as to whether N=C, where C is a number which the system or network manager has determined to be an indication, or at least a valid suspicion, that there is an intrusion by an unauthorized user. It will be understood that routines for determining unauthorized intrusion may involve other more complex routines for monitoring events, but this is a simplified example. Accordingly, if the decision from step 92 is No, the procedure is returned to the starting point where the next user request is awaited. If the decision from step 92 is Yes and indicates an intrusion, then, step 93, the target file is renamed. For example, if the file were a customer credit card file originally named "customer_credit_cards", it may be renamed "Dow_Jones_avg". For security reasons, the rename should give no information about the contents of the file, i.e. credit card numbers. The whole file is then moved, step 94, to another hidden or covert directory, e.g. "/usr" and assigned, step 95, a covert name, e.g. "/usr/bin/x.html", which is indicative of the files covert location in the covert directory. An entry is then made in a covert log which relates each renamed file to its covert directory location, step 96. The owner of the file is notified, step 97. Conveniently, at this point or after an authenticated user is granted file access in prior step 89, a determination is made as to whether there is a session end, step 98. If Yes, the session is exited. If No, then, via branch "A", the procedure is returned to the starting point where the next user request is awaited.

It should be noted that the programs covered by the present invention may be stored outside of the present computer systems until they are required. The program instructions may be stored in another readable medium, e.g. in disk drive associated with the desktop computer or in a removable memory, such as an optical disk for use in a CD RON computer input or in a floppy disk for use in a floppy disk drive computer input. Further, the program instructions may be stored in the memory of another computer prior to use in the system of the present invention and transmitted over a network when required by the user of the present invention.

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

The invention claimed is:

1. In a data processing operation having stored data in a plurality of data files, a method for protecting said data files from unauthorized users comprising:

receiving user requests for access to data files;

determining whether said requests are unauthorized intrusions into said requested data files; and changing the identification of the requested data files responsive to a determination that a request is unauthorized.

2. The data processing method of claim 1 wherein said step of changing the identification of said requested data files changes the overt identification of the requested files.

3. The data processing method of claim 2 wherein said step of changing the overt identification of said requested data files renames said files.

4. The data processing method of claim 3 wherein said file renames do not indicate the contents of the renamed files.

5. The data processing method of claim 4 further including the step of moving said renamed files into a new directory.

6. The data processing method of claim 5 further including the step of assigning to each of the renamed files a covert name indicating a covert location in said new directory for each of said renamed files.

7. The data processing method of claim 6 further including the step of forming a log referencing each renamed file to the covert name of the respective file so as to indicate the covert location of said file in said new directory.

8. In a communication network with access to a plurality of network sites each having stored data in a plurality of data files accessible in response to requests from users at other sites in the network, a method for protecting said network site data files from unauthorized users comprising:
   receiving user requests for access to data files at a network site;
   determining at said network site whether said user requests are unauthorized intrusions into said requested data files; and
   changing the identification of the requested data files responsive to a determination that a request is unauthorized.

9. The communication network method of claim 8 wherein said step of changing the identification of said requested data files changes the overt identification of the requested files.

10. The communication network method of claim 9 wherein said step of changing the overt identification of said requested data files renames said files.

11. The communication network method of claim 10 wherein said file renames do not indicate the contents of the renamed files.

12. The communication network method of claim 11 further including the step of moving said renamed files into a new directory.

13. The communication network method of claim 12 further including the step of assigning to each of the renamed files a covert name indicating a covert location in said new directory for each of said renamed files.

14. The communication network method of claim 13 further including the step of forming a log referencing each renamed file to the covert name of the respective file so as to indicate the covert location of said file in said new directory.

15. The communication network method of claim 8 wherein said network is the World Wide Web, and said network sites are Web sites.

16. A system for protecting scored data files from unauthorized users, the system comprising:
   a processor;
   a computer memory holding computer program instructions which when executed by the processor perform the method comprising:
   receiving user requests for access to data files;
   determining whether said requests are unauthorized intrusions into said requested data files; and
   changing the identification of the requested data files responsive to a determination that a request is unauthorized.

17. The system of claim 16 wherein said changing the identification of said requested data files changes the overt identification of the requested files.

18. The system of claim 17 wherein said changing the overt identification of said requested data files renames said files.

19. The system of claim 18 wherein said file renames do not indicate the contents of the renamed files.

20. The system of claim 19 wherein the performed method further includes moving said renamed files into a new directory.

21. The system of claim 20 wherein the performed method further includes assigning to each of The renamed files a covert name indicating a covert location in said new directory for each of said renamed files.

22. The system of claim 21 wherein the performed method further includes forming a log referencing each renamed file to the covert name of the respective file so as to indicate the covert location of said file in said new directory.

23. A system for protecting data files at a plurality of network sites from unauthorized users in a communication network, each site having stored data in a plurality of data files accessible in response to requests from users at other sites in the network, the system comprising:
   a processor;
   a computer memory holding computer program instructions which when executed by the processor perform the method comprising:
   receiving user requests for access to data files at a network site;
   determining at said network site whether said user requests are unauthorized intrusions into said requested data files; and
   changing the identification of the requested data files responsive to a determination that a request is unauthorized.

24. The system of claim 23 wherein said changing the identification of said requested data files changes the overt identification of the requested files.

25. The system of claim 9 wherein said changing the overt identification of said requested data files renames said files.

26. The system of claim 25 wherein said file renames do not indicate the contents of the renamed files.

27. The system of claim 26 wherein the performed method further includes moving said renamed files into a new directory.

28. The system of claim 27 wherein she performed method further includes assigning so each of the renamed files a covert name indicating a covert location in said new directory for each of said renamed files.

29. The system of claim 28 wherein the performed method further includes forming a log referencing each renamed file to the covert name of the respective file so as to indicate the covert location of said file in said new directory.

30. The system of claim 23 wherein said network is the World Wide Web, and said network sites are Web sites.

31. A computer usable storage medium having stored thereon a computer readable program for protecting stored data files from unauthorized users, wherein the computer readable program when executed on a computer causes the computer to:
   receive user requests for access to data files;
   determine whether said requests are unauthorized intrusions into said requested data files; and
   change the identification of the requested data files responsive to a determination that a request is unauthorized.

32. The computer usable storage medium of claim 31 wherein the computer program when executed changes the identification of said requested data files by changing the overt identification of the requested files.

33. The computer usable storage medium of claim 32 wherein the computer program changes the overt identification of said requested data files by renaming said files.

34. The computer usable storage medium of claim 33 wherein said file renames do not indicate the contents of the renamed files.

35. The computer usable storage medium of claim 34, wherein the computer program when executed further causes the computer to move said renamed files into a new directory.

36. The computer usable storage medium of claim 35, wherein the computer program when executed further causes the computer to assign to each of the renamed files a covert name indicating a covert location in said new directory for each of said renamed files.

37. The computer usable storage medium of claim 36, wherein the computer program when executed further causes the computer to forming a log referencing each renamed file to the converted name of the respective file so as to indicate the converted location of said file in said new directory.

38. A computer usable storage medium having stored thereon a computer readable program for protecting data files at a plurality of network sites from unauthorized users in a communication network, each site having stored data in a plurality of data files accessible in response to requests from users at other sites in the network, wherein the computer readable program when executed on a computer causes the computer to:
receive user requests for access to data files at a network site;
determine at said network site whether said user requests are unauthorized intrusions into said requested data files; and
change the identification of the requested data files responsive to a determination that a request is unauthorized.

39. The computer usable storage medium of claim 38 wherein the computer program when executed changes the identification of said requested data files by changing the overt identification of the requested files.

40. The computer usable storage medium of claim 39 wherein the computer program changes the overt identification of said requested data files by renaming said files.

41. The computer usable storage medium of claim 40 wherein said file renames do not indicate the contents of the renamed files.

42. The computer usable storage medium of claim 41, wherein the computer program when executed further causes the computer to move said renamed files into a new directory.

43. The computer usable storage medium of claim 42, wherein the computer program when executed further causes the computer to assign to each of the renamed files a covert name indicating a covert location in said new directory for each of said renamed files.

44. The computer usable storage medium of claim 43, wherein the computer program when executed further causes the computer to forming a log referencing each renamed file to the converted name of the respective file so as to indicate the converted location of said file in said new directory.

45. The computer usable storage medium of claim 38, wherein said network is the World Wide Web, and said network sires are Web sites.

\* \* \* \* \*

UNITED STATES PATENT AND TRADEMARK OFFICE
CERTIFICATE OF CORRECTION

PATENT NO.       : 7,647,402 B2         Page 1 of 1
APPLICATION NO. : 09/801612
DATED            : January 12, 2010
INVENTOR(S)      : McBrearty et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2803 days.

Signed and Sealed this

Sixteenth Day of November, 2010

David J. Kappos
*Director of the United States Patent and Trademark Office*